Figure 1:
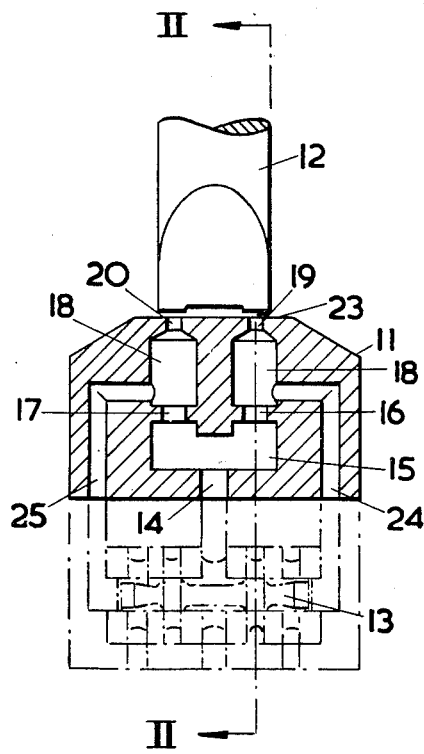

Oct. 2, 1962        G. T. EYNON        3,056,416

CONTROL MEANS FOR FLUID PRESSURE SYSTEMS

Filed July 9, 1959        6 Sheets-Sheet 1

Inventor
GEORGE THOMAS EYNON
By
Larson and Taylor Attorney

Oct. 2, 1962 G. T. EYNON 3,056,416
CONTROL MEANS FOR FLUID PRESSURE SYSTEMS
Filed July 9, 1959 6 Sheets-Sheet 5

*Inventor*
GEORGE THOMAS EYNON
*By*
Larson and Taylor *Attorney*

Oct. 2, 1962  G. T. EYNON  3,056,416
CONTROL MEANS FOR FLUID PRESSURE SYSTEMS
Filed July 9, 1959  6 Sheets-Sheet 6

Inventor
GEORGE THOMAS EYNON
By
Attorney

United States Patent Office 3,056,416
Patented Oct. 2, 1962

3,056,416
CONTROL MEANS FOR FLUID PRESSURE SYSTEMS
George Thomas Eynon, Farnborough, England, assignor to National Research Development Corporation, London, England, a British corporation
Filed July 9, 1959, Ser. No. 825,985
Claims priority, application Great Britain July 11, 1958
17 Claims. (Cl. 137—82)

This invention relates to fluid pressure systems and especially to those in which a controlled member is moved by fluid under pressure, for example an hydraulic system for operating the rudder or other control surface of an aircraft.

In such systems it is well known to employ either direct or single stage control means which directly control the flow of pressure fluid to a power actuator or, alternatively, e.g. where greater sensitivity of control is required, indirect or two stage control means of which the first stage controls the flow of pressure fluid to a second stage which latter is operated by fluid under pressure to control in its turn the flow of pressure fluid to the actuator.

It is also known in such control means to employ two needle valves mounted upon a swinging control arm progressively to open the one and to close the other of two leakage outlets from two fluid chambers interposed in two connections to the two sides of an actuator, or of a second control stage, so as to increase the pressure at the one side and decrease that at the other, or vice versa, according to the direction in which the arm is swung from a neutral or "off" position.

In accordance with the present invention leakage control means for a fluid pressure system comprise a body member formed with a smooth face and a leakage outlet extending to said smooth face, an obturating member formed with a smooth obturating face portion complementary to that of the body member, and means supporting the obturating member for movement relative to the body member with its smooth obturating face portion presented to the smooth face of the body member at a constant small spacing therefrom increasingly to cover the outlet when the obturating member is moved in the one direction and increasingly to uncover the outlet when the obturating member is moved in the other direction from an intermediate position in which its smooth obturating surface portion partially covers said outlet.

Thus leakage control means for a fluid pressure system having a controlled member which is moved in accordance with the pressure differential at opposite sides thereof as determined by differential leakage from pressure fluid supply connections to said sides thereof, respectively, according to the invention, may comprise a body member formed with two smooth face portions and with two supply passages and with leakage outlets therefrom which extend to said smooth face portions, respectively, an obturating member formed with two smooth obturating face portions complementary to the smooth face portions of the body portion, and means supporting the obturating member for movement relative to the body member with its obturating face portions presented to the smooth face portions of the body member at a constant small spacing therefrom increasingly to cover the one and uncover the other outlet in the body member when the obturating member is moved in the one direction and increasingly to uncover the one and cover the other outlet when the obturating member is moved in the other direction from an intermediate position in which its smooth obturating surface portions partially cover both outlets.

In general, the smooth faces of the body member and the obturating member will be plane surfaces.

It will be seen that the obturating surface of the obturating member has a boundary which extends across the corresponding outlet in the body member when the obturating member is in the intermediate position referred to. According to a feature of the invention part of the surface of the obturating member which extends from this boundary of its obturating surface away from the body member is formed as a shaped reaction face to cause the force exerted upon the obturating member by fluid leaking from the outlet in the body member to have a required component in the direction of the relative movement of the obturating member. This force component may be "positive" tending to reduce displacement of the obturating member from a mid-position, "negative," tending to increase such displacement, or "zero," having no tendency to change such displacement.

Leakage control means may be designed for "immersed" operation with the obturator immersed in the operating liquid in a container forming part of a closed pressure fluid circuit, or for "non-immersed" operation, for example, with the obturating member exposed to the atmosphere into which leakage of pressure liquid takes place to be drained away to a reservoir.

Figure 2:
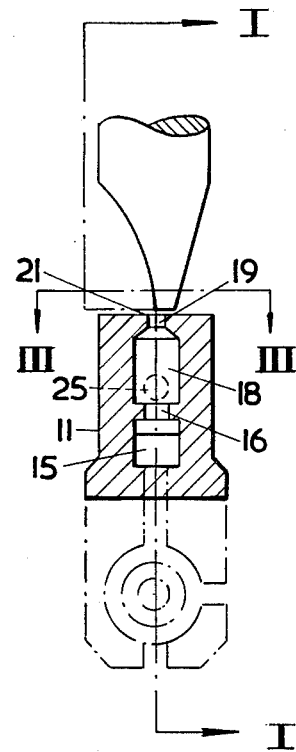
Figure 3:
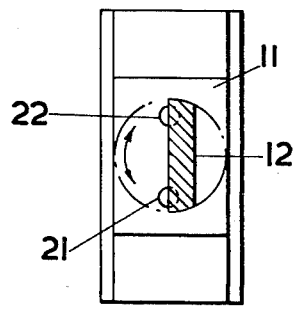
Figure 4A:
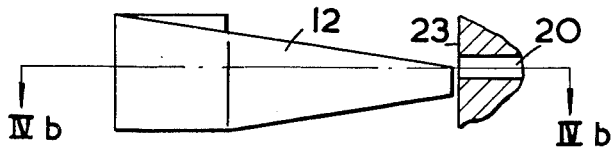
Figure 4B:
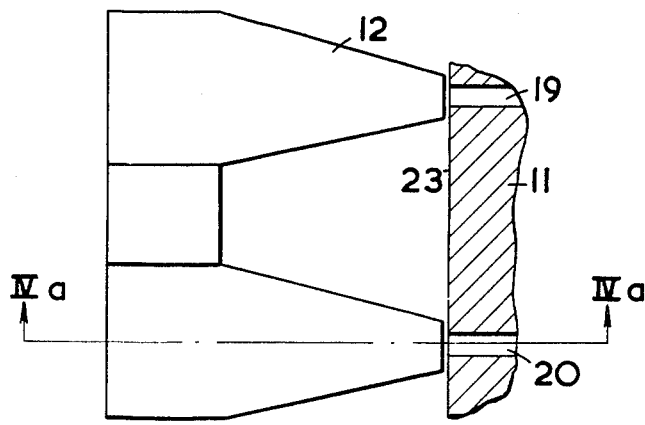
Figure 4C:
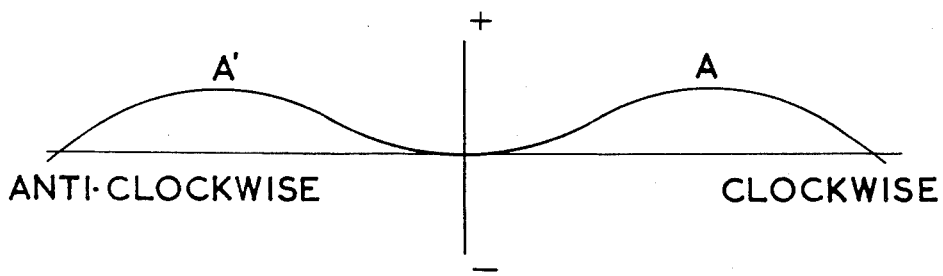
Figure 5A:
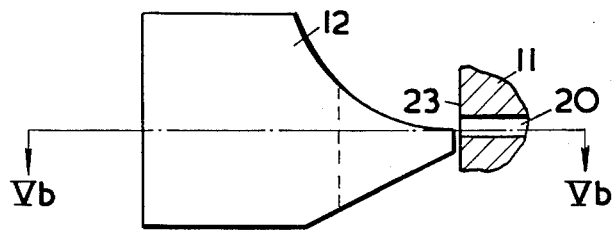
Figure 5B:
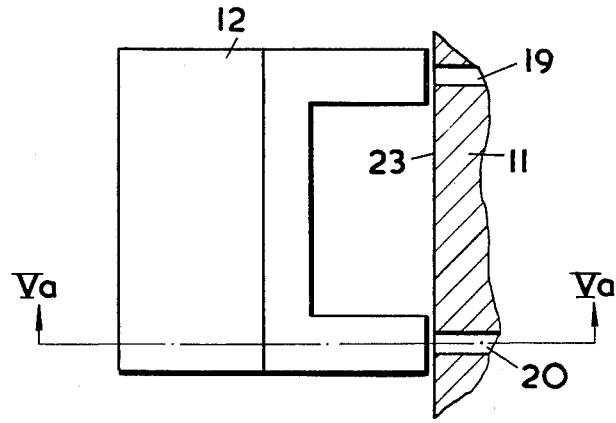
Figure 7A:
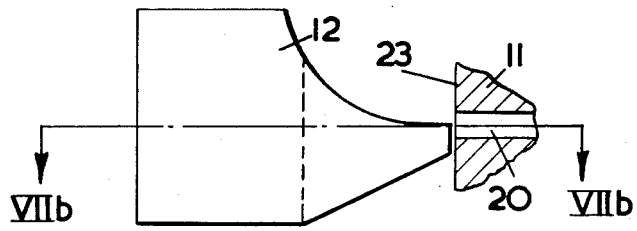
Figure 7B:
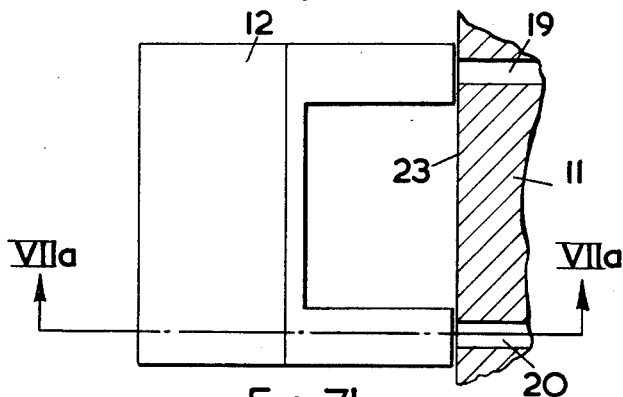
Figure 8A:
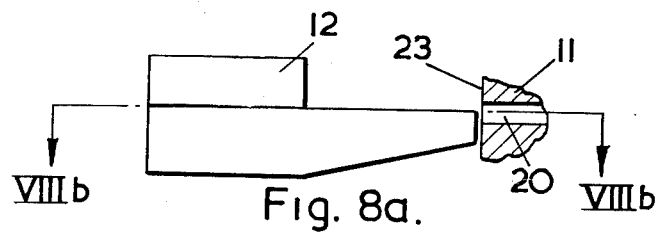
Figure 8B:
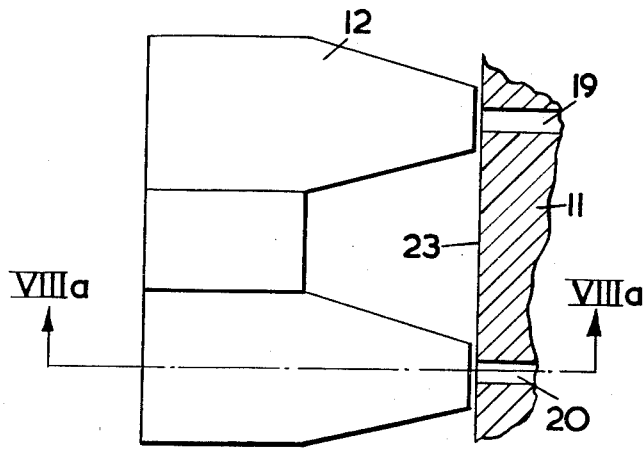

The invention is illustrated by the accompanying diagrammatic drawings of which:

FIGURES 1, 2 and 3 show a preferred form of control means for operating an actuator valve,
FIGURE 1 being a sectional side elevation on the line I—I of FIGURE 2,
FIGURE 2 being a sectional elevation on the line II—II of FIGURE 1 and
FIGURE 3 being a sectional plan view on the line III—III of FIGURE 2;
FIGURES 4a and 4b show in part sectional side elevation and plan, respectively, an obturating member and associated leakage orifices for "non-immersed" operation, and FIGURE 4c is a corresponding graph showing the torque reaction of the obturating member plotted vertically against its angular rotation, in one sense or the other from the neutral position shown in FIGURES 4a and 4b, plotted horizontally;
FIGURES 5a, b and c, and FIGURES 6a, b and c are corresponding part sectional side elevations, plans and graphs respectively, of two further obturating members (12) for "non-immersed" operation and
FIGURES 7a, b and c, and FIGURES 8a, b and c are corresponding part sectional side elevations, plans and graphs, respectively, of two obturating members (12) of different shape for "immersed" operation.

Referring first to FIGURES 1, 2 and 3 of the drawings the control means comprises a body member 11 and an obturating member 12. The body member 11 is formed with a main inlet passage 14 leading to a main pressure fluid chamber 15 which in turn is connected by inlets 16, 17 to two control chambers 18, 18, respectively, for pressure fluid, and with leakage outlets 19, 20 which terminate at apertures 21, 22 (FIGURE 3) at a smooth flat face 23 of the outlet member 11 and lead from the control chambers 18, 18 respectively. Also, supply outlets 24, 25 lead from the chambers 18, 18 to the opposite ends, respectively of a second control stage valve of well known type which is indicated generally at 13. The obturating member 12 comprises a shaft mounted for angular movement about its axis which is normal to the face 23 at a point mid-way between the leakage outlets 19, 20, and presents to the face 23 of the outlet member in close proximity thereto two smooth flat faces which register with the outlet apertures 21 and 22 in said face 23 as clearly shown in FIGURES 1 and 3. This assembly is enclosed in a container (not shown).

In operation fluid under pressure flows from the inlet 14 through the chambers 15, 18 and 18 to the outlets 19, 20 and 24, 25. When the obturating member 12 is in a neutral position as shown, fluid leaks at an equal rate from both the outlets 19 and 20 and returns via the container (not shown) to a fluid reservoir (not shown). The pressure in the chambers 18, 18 and in the supply outlets 24, 25 thus remains equal and the second stage valve remains in a condition of equilibrium. Upon rotation of the obturating member 12 in either sense one of the leakage outlet apertures 21, 22 is closed and the other opened wholly or partially, depending on the sense and amount of rotation. As a result, the pressure in one of the control chambers 18, 18 rises and that in the other falls and the valve 13 is moved by the differential pressure thus created across it.

The obturating member 12 is cut away to afford reaction faces so shaped that upon angular displacement of said member about its axis in either sense from the neutral position shown, the fluid flow over it either tends to increase or to reduce such displacement or has no such tendency as may be required in any particular case, i.e. to produce a "negative," "positive" or "neutral" torque reaction.

In FIGURE 1 the obturating member 12 is cut away slightly between the obturating surface portions corresponding to the leakage outlets 19 and 20. In some cases, however, it is desirable that the obturating surfaces should be at the ends of two projections as shown, for example, in FIGURES 4a, 4b and FIGURES 5a, 5b in order to avoid turbulence effects.

As stated above, leakage control means according to the invention are useful for either "immersed" operation with the obturator member immersed in a closed pressure fluid circuit, or for "non-immersed" operation with the obturator member and the leakage outlets exposed, for example to the atmosphere.

Although, in all cases, the reaction faces must be of large area as compared with the outlets, the precise shaping thereof to produce a torque reaction of required magnitude and sense is, in practice, determined experimentally or by trial and error, no great difficulty having been experienced in so doing. The precise functioning is generally of a complex nature inevitably involving divers factors, being dependent upon fluid flow over the reaction faces rather than merely impingement of fluid thereon.

However, typical cases are shown in FIGURES 4a—8c, by way of example.

Figure 8C:
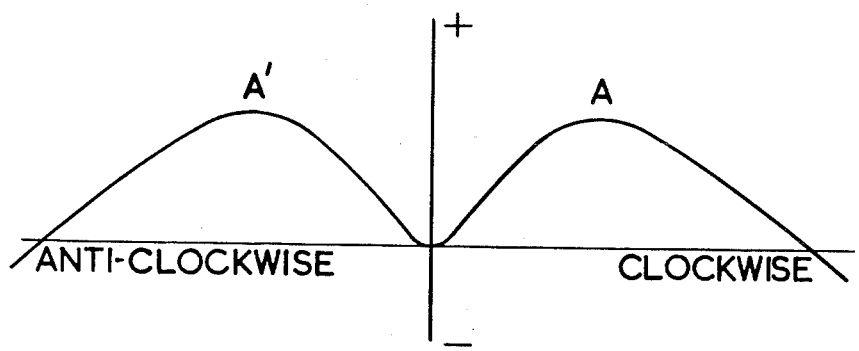

In the cases of FIGURES 4a, b and c, and 8a, b and c rotation of the obturating member 12 in either sense from the neutral position in which it is shown up to the positions indicated at A and A', respectively in FIGURES 4c and 8c, results in an increasing "positive" torque reaction on the obturating member 12.

Figure 5C:
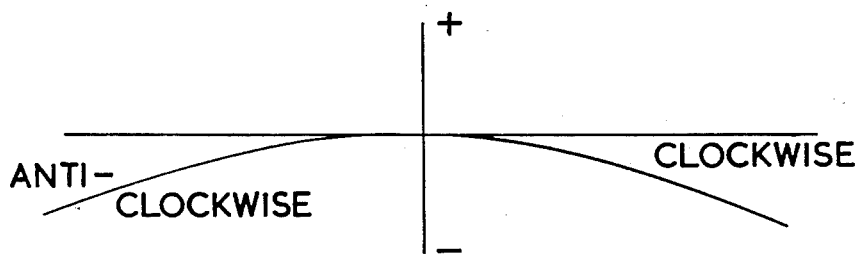
Figure 7C:
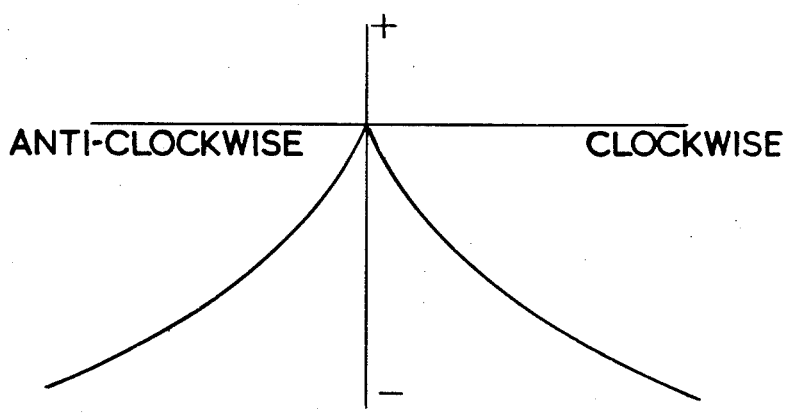

In the cases of FIGURES 5a, b and c, and 7a, b and c rotation of the obturating member 12 in either sense from the neutral position results in an increasing "negative" torque reaction on the obturating member 12 for increased rotation as shown in FIGURES 5c and 7c.

Figure 6A:
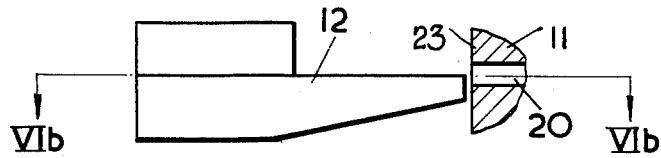
Figure 6B:
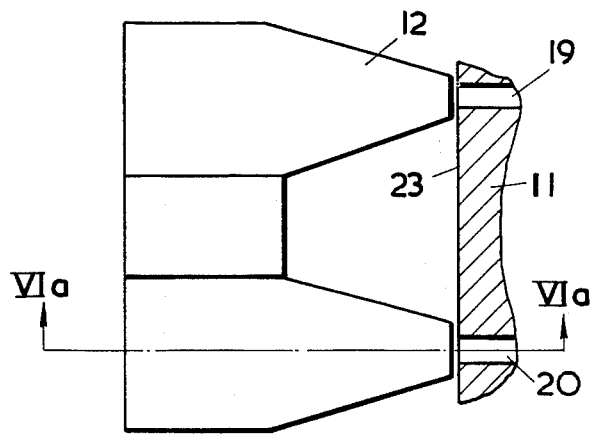
Figure 6C:
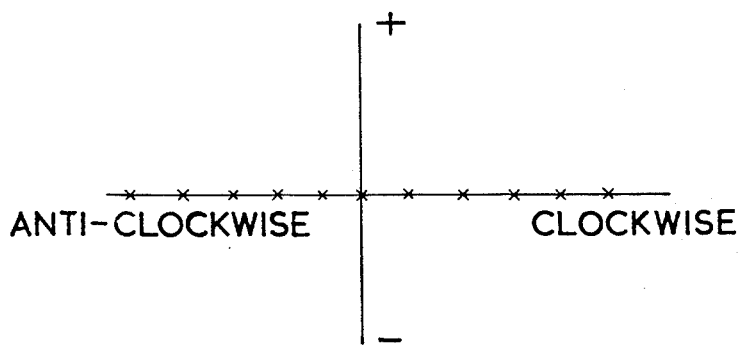

In the case of FIGURES 6a, b and c the torque reaction on the obturating member 12 remains at "zero" for all positions of the obturating member 12.

In general, for precision working it is desirable that the spacing between the obturating face portion(s) of the obturating member and the complementary face portion(s) of the body member should be as small as possible short of actual contact between them. However, appreciable leakage between these surface portions may be permitted in many cases.

The obturating member may be moved to control the leakage in any known or convenient manner, for example by a torque motor at the output of a computer in an automation system or even by hand.

I claim:

1. Leakage control means for a fluid pressure system, comprising a body member formed with a smooth face and an internal pressure fluid leakage passage terminating at a leakage outlet at said smooth face, an obturating member formed with an obturating face and with a large reaction face which faces meet one another at a common meeting edge, said obturating face being complementary to the smooth face of the body member, said obturating member being disposed with its large reaction face presented for the flow thereover of fluid from the leakage outlet and with its obturating face presented to but clear of the smooth face of the body member and being movable in opposite senses with the common meeting edge of the obturating and reaction faces extending across the leakage outlet to vary the opening of the latter, the large reaction face being many times the area of the leakage outlet and being shaped and disposed to determine within the limits of the energy of the pressure fluid from the leakage outlet the magnitude and also the sense of the effective torque reaction upon the obturating member due to the flow of said fluid over the reaction face.

2. Leakage control means as defined in claim 1 in which the smooth face of the body member and the obturating face are plane surfaces and the obturating member is movable relative to the body member angularly about an axis extending normal to said surfaces.

3. Leakage control means as defined in claim 2 in which the reaction face has its smallest width, as defined by its line of intersection with the obturating face, at said intersection and is of progressively increasing width for a substantial distance away from the obturating face.

4. Leakage control means as defined in claim 1 in which the reaction face is a plane surface and extends generally in the direction of the fluid flow from the outlet when the obturating member is in an intermediate position.

5. Leakage control means as defined in claim 4 in which the reaction face has its smallest width, as defined by its line of intersection with the obturating face, at said intersection and is of progressively increasing width for a substantial distance away from the obturating face.

6. Leakage control means as defined in claim 4 in which the smooth face of the body member and the obturating face are plane surfaces and the obturating member is movable relative to the body member angularly about an axis extending normal to said surfaces.

7. Leakage control means as defined in claim 4 in which the reaction face has its smallest width, as defined by its line of intersection with the obturating face, at said intersection, and in which the smooth face of the body member and the obturating face are plane surfaces and the obturating member is movable relative to the body member angularly about an axis extending normal to said surfaces.

8. Leakage control means as defined in claim 1 in which the reaction face has its smallest width, as defined by its line of intersection with the obturating face, at said intersection and is of progressively increasing width for a substantial distance away from the obturating face.

9. Leakage control means for a fluid pressure system comprising a body member formed with two smooth faces, two leakage passages for pressure fluid extending in said body member to said smooth faces and terminating at two outlets, one at each of said faces, an obturating member formed with two smooth obturating faces complementary to the smooth faces of the body member and also having two reaction faces extending one from each of said obturating faces respectively, said obturating member being disposed movably at a neutral position in which each obturating face partially covers one of said outlets and being movable in opposite directions from said neutral position to vary the opening of each of said outlets and being disposed to retain a constant clearance between the complementary faces, and each of said reaction faces being adapted to determine the magnitude and also the sense of the effective torque reaction on said obturating member in response to the force of the flow of pressure fluid escaping from said outlets.

10. Leakage control means as defined in claim 9 in which the smooth faces of the body member and the obturating faces are plane surfaces and the obturating member is movable relative to the body member angularly about an axis extending normal to said surfaces.

11. Leakage control means as defined in claim 10 in which each reaction face has its smallest width, as defined by its line of intersection with the obturating face, at said intersection and is of progressively increasing width for a substantial distance away from the obturating face.

12. Leakage control means as defined in claim 9 in which the reaction faces are plane surfaces extending generally in the direction of the fluid flow from the corresponding outlet when the operating member is in an intermediate position.

13. Leakage control means as defined in claim 12 in which each reaction face has its smallest width, as defined by its line of intersection with the obturating face, at said intersection and is of progressively increasing width for a substantial distance away from the obturating face.

14. Leakage control means as defined in claim 12 in which the smooth faces of the body member and the obturating faces are plane surfaces and the obturating member is movable relative to the body member angularly about an axis extending normally with respect to said surfaces.

15. Leakage control means as defined in claim 12 in which each reaction face has its smallest width, as defined by its line of intersection with the obturating face, at said intersection and is of progressively increasing width for a substantial distance away from the obturating face, and in which the smooth faces of the body member and the obturating faces are plane surfaces and the obturating member is movable relative to the body member angularly about an axis extending normally with respect to said surfaces.

16. Leakage control means as defined in claim 9, said body member having a pressure fluid supply connection to said leakage passages, a control valve member in said body member, pressure fluid supply connections extending from said leakage passages to opposite sides of said valve member respectively, and said valve member being movable in accordance with the differential fluid pressure at opposite sides thereof.

17. Leakage control means as defined in claim 9, in which each reaction face has its smallest width, as defined by its line of intersection with the obturating face, at said intersection and is of progressively increasing width for a substantial distance away from the obturating face.

References Cited in the file of this patent

UNITED STATES PATENTS

| | | |
|---|---|---|
| 1,763,994 | Thoma | June 17, 1930 |
| 2,129,586 | Moller | Sept. 6, 1938 |
| 2,166,705 | Hockschulz | July 18, 1939 |
| 2,813,519 | Persson et al. | Nov. 19, 1957 |
| 2,832,365 | Smith | Apr. 29, 1958 |
| 2,836,154 | Lantz | May 27, 1958 |

FOREIGN PATENTS

| | | |
|---|---|---|
| 931,747 | Germany | Aug. 16, 1955 |